United States Patent [19]

Lamb, III

[11] 4,224,200

[45] Sep. 23, 1980

[54] POLYMER CURING SYSTEM, AIR-CURABLE COMPOSITION AND METHOD OF PREPARING THE COMPOSITION

[75] Inventor: Charles M. Lamb, III, Bartlesville, Okla.

[73] Assignee: Phillips Petroleum Company, Bartlesville, Okla.

[21] Appl. No.: 954,037

[22] Filed: Oct. 23, 1978

[51] Int. Cl.² ............................................ C08L 91/00
[52] U.S. Cl. ............................ 260/18 R; 252/431 C; 260/37 R; 260/37 AL; 528/279; 528/293; 528/374
[58] Field of Search ................. 528/279, 293, 374; 252/431 C; 260/18 R, 37 R, 37 AL

[56] References Cited

U.S. PATENT DOCUMENTS

| | | | |
|---|---|---|---|
| 3,247,138 | 4/1966 | Jorczak et al. | 260/18 |
| 3,349,047 | 10/1967 | Sheard | 260/18 |
| 3,618,760 | 11/1971 | Strong | 260/18 |
| 3,991,039 | 11/1976 | Gunter et al. | 260/79 |
| 4,067,842 | 1/1978 | Braden | 260/31.6 |
| 4,113,707 | 9/1978 | Louthan et al. | 528/279 |

FOREIGN PATENT DOCUMENTS 745212 10/1966 Canada.
661362 11/1951 United Kingdom.

*Primary Examiner*—Melvyn I. Marquis

[57] ABSTRACT

A mercaptan-containing compound and a particular curing package comprise a composition which is curable on exposure to an atmosphere containing oxygen.

21 Claims, No Drawings

POLYMER CURING SYSTEM, AIR-CURABLE COMPOSITION AND METHOD OF PREPARING THE COMPOSITION

FIELD OF THE INVENTION

This invention relates to a polymer curing system, to an air-curable composition, and to a method of producing the air-curable composition. In one aspect, it relates to a cured composition. In another aspect, it relates to articles of manufacture prepared from such cured compositions.

BACKGROUND OF THE INVENTION

Mercaptan-containing polymers having at least two terminal (i.e., reactive) mercaptan groups can be easily cured at room temperature to produce elastomers having excellent properties, such as for example, resistance to weathering, oil, ozone, and water which makes these suitable for a variety of uses. Because such polymers are easily cured and are resistant to the elements they have been widely used as sealants and adhesives, as well as in many other applications. These mercaptan-containing polymers, however, have generally had the disadvantage that a "curing agent" had to be added to the polymers just prior to their use.

When a sealant composition comprising at least two components must be mixed just prior to use, such a sealant composition is normally called a "two-package" sealant system; whereas, a sealant composition that can be premixed and stored without a substantial amount of curing for a reasonable period of time and thus is sold "ready to use" is called a "one-package" sealant system. A one-package sealant composition must be capable of remaining relatively uncured in a container for an extended period of time, for example about six months, and then begin to cure after and only after being exposed to environmental conditions, such as air, water, or light.

Two-package systems are often used as standards against which one-package systems are compared because two-package systems have been in use for a long period of time (and are thus well established) and because they generally have better performance properties than one-component systems. However, one-package systems are generally preferred systems since they can be applied directly from a container without any necessity of mixing at the time of application and thus avoid the potential problem of improper mixing of the components. Several attempts have been made to develop one-package systems that contain both the sealant base and the curing agent and which are activated only when exposed to normal environmental conditions. An example of a one-package system is disclosed in U.S. Pat. No. 3,225,017, wherein a mercaptan-terminated polysulfide-based composition is cured by exposure to moisture. That system requires much moisture to cure and, therefore, is not useful in relatively arid climates.

Another one-package system is disclosed in U.S. Pat. No. 3,991,039, wherein a mercaptan-containing polysulfide polymer-based composition is cured by exposure to air or oxygen. In that patent, a curing package comprising a combination of a thiuram disulfide and an iron or manganese complex is disclosed. However, that curing package does not effectively cure all types of mercaptan-containing polymers; and, in particular, it does not effectively cure certain mercaptan-containing polymers which contain mostly monosulfide linkages with minor amounts of disulfide and polysulfide linkages (and which are disclosed in U.S. Pat. No. 3,817,936 and in recently allowed application having Ser. No. 737,948 now U.S. Pat. No. 4,113,707) such polymers generally remaining tacky for long periods of time when the above-described curing package is mixed with them.

A curing package has now been found which effectively cures even mercaptan-containing polymers with mostly monosulfide linkages. The compositions become tack-free to polyethylene film within a relatively short period of time and have good resilience.

It is an object of this invention to produce air-curable compositions which can be used to prepare "one-package" sealants.

It is a further object of this invention to produce air-cured sealant compositions which cure rapidly.

STATEMENT OF THE INVENTION

According to the invention, a curing system suitable for curing comprises (a) at least one Group IA, IB, IIA, IIB, IVA, VA, or VIA metal substituted dithiocarbamate and (b) at least one Group VIIB or VIII metal compound of a carboxylic acid or at least one Group VIIB or VIII metal compound of a beta-diketone. In one embodiment, the above-recited curing system is used to cure a particular polymer. And in another embodiment, an air-curable composition is provided.

The above-recited curing system is useful for curing mercaptan-containing compounds having at least one mercaptan group per molecule.

In this specification, the periodic chart which was used was found in the *Chemical Rubber Company (CRC) Handbook of Chemistry and Physics*, 49th Edition.

In this application, the term "cure" means that the composition being described has changed from a pourable, spreadable, or extrudable state to a condition in which the composition is not pourable, spreadable, or extrudable. Generally, the cured composition has a surface that is tack-free either to finger touch or to polyethylene film.

In this application, the term "mercaptan" should be understood to be synonymous with "thiol".

The compositions of the invention can be used as sealants and adhesives to great advantage since they cure rapdily and effectively merely on exposure to air or oxygen, becoming tack-free to polyethylene film within a relatively short period of time. They require no mixing of ingredients just prior to their use, and they can be stored with little or no side effects for long periods of time.

It is believed that oxygen is the active ingredient which operates to activate the curing agent. Therefore, besides air, any other oxygen-containing atmosphere will be expected to effect this activation.

DESCRIPTION OF THE PREFERRED EMBODIMENTS

In the practice of the invention, any material containing at least one mercaptan group will be expected to cure by the curing system described below. This includes both monomers, as well as polymers. However, polymers are preferred as the base material (i.e., the material to be cured) in the practice of the invention because of economic reasons (for stoichiometric coupling, the weight ratio of polymer to curing agent being greater than the weight ratio of monomer to curing agent) and because polymers are generally more often used in elastomeric applications than are monomers. The molecular weight of the polymers to be cured can be selected over a wide range, generally lying within the range from about 100 to about 100,000. However, generally the polymers preferred in the practice of the invention will have a molecular weight greater than about 1,000; and often the polymers will have a molecular weight greater than about 10,000 and less than about 20,000. Suitable polymers include polymers which are liquid (i.e., pourable) at about room temperature as well as polymers which are solid at about room temperature, although liquid polymers are preferred materials because of the ease with which they can be mixed with the curing system. If a solid polymer is used, it should preferably be ground into small pieces and dissolved in a liquid, which liquid should preferably be one of the liquid components of the composition which is to be prepared.

Although, as discussed above, any mercaptan-containing compound can be used in the practice of the invention, it is preferred that at least two and more preferably 3 to 5 mercaptan groups per molecule on the average be present. The average number of mercaptan groups per molecule of a material is the average mercaptan functionality of that material. When two or more such groups are present, upon curing, the cured composition acquires substantial elastomeric character. If only one mercaptan group is present on a molecule, elastomeric character would generally not be acquired to a substantial extent upon curing.

In the following examples, a mercaptan-containing liquid PM Polymer* was used. This material is mostly a poly(oxyalkylene)-polyesterpoly(monosulfide)-polythiol, the properties of which are described below. Methods of preparation of this polymer are well known in the art, for example in U.S. Pat. No. 3,817,936 and in the recently allowed application having Ser. No. 737,948 now U.S. Pat. No. 4,113,707.

*Registered Trademark of Phillips Petroleum Company.

Two methods for preparing the poly(oxyalkylene)-polyesterpoly(monosulfide)-polythiols which have at least three mercapto groups, which are known in the art, and which are cured with the curing system of the present invention are: (1) reacting at least one mercaptoalkanoic acid and at least one thiodialkanoic acid with poly(oxyalkylene)-polyols having at least three pendant hydroxy groups per molecule or (2) reacting a mercapto-alkanoic acid ester and a thiodialkanoic acid ester with poly(oxyalkylene)-polyols having at least three pendant hydroxyl groups per molecule.

When either the method described in U.S. Pat. No. 3,817,936 or the method described in the application having Ser. No. 737,948, now U.S. Pat. No. 4,113,707, is used, the mercaptan-containing polymers which are prepared appear to be essentially the same except for slight differences in stability and pH and exhibit most of the same physical properties. It is believed that the curing system described herein performs equally well with polymers made by either method. However, the PM Polymer used in the examples in this specification was prepared by the method described in Ser. No. 737,948 now U.S. Pat. No. 4,113,707. Properties of a typical sample of poly(oxyalkylene)-polyester-poly(-monosulfide)-polythiol produced by either method noted above are shown in Table I. The properties of an individual sample may vary; and hence ranges are given in Table I where appropriate.

Table I

Typical Properties of Poly(Oxyalkylene)-Polyester-Poly(Monosulfide)-Polythiol (PM Polymer)

| | |
|---|---|
| Physical state | liquid |
| Viscosity, poise, 25° C. (77° F.) | 70 ± 20 |
| Color | light yellow |
| Mercaptan sulfur, wt. % | 0.85 ± 0.1 |
| Estimated molecular weight | 12,000 to 15,000 |
| Estimated average mercaptan functionality per molecule | 3–5 |
| Specific gravity | 1.02 ± 0.01 |
| Density, lbs./gal | 8.3 |
| pH (of a saturated water extract of PM Polymer) | 7.03 ± 1.0 |

In the practice of the invention, a curing system comprising a mixture of two types of ingredients will generally be used. It has been found that when both ingredients are present together, a cure is provided; whereas when either material is used alone, no observable amount of cure is obtained. These two materials will be called type A and type B curing agents, both of these materials being metal complexes.

In the practice of the invention, curing agent type A is selected from the group consisting of metal substituted dithiocarbamates. These are represented by the formula

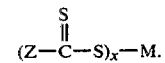

In this formula, M can be any metal or mixture of metals found in Groups IA, IB, IIA, IIB, IVA, VA or VIA of the periodic table; Z can be an amino group (i.e., $H_2N-$), a disubstituted amino group (i.e., $RR'N-$, wherein R and R' can be the same or a different hydrocarbyl group having from 1 to about 18 carbon atoms), a monosubstituted amino group ($HRN-$, wherein R is a hydrocarbyl group having from 1 to about 18 carbon atoms), or a heterocyclic amino group (for example, piperidine); and x can be 1, 2, 3, or 4, depending upon the valence of the metal employed. Some examples of suitable type A curing agents include the following: sodium monoethyldithiocarbamate, sodium di-n-butyldithiocarbamate, calcium diethyldithiocarbamate, cadmium diethyldithiocarbamate, bismuth dimethyldithiocarbamate, copper dimethyldithiocarbamate, zinc monomethyldithiocarbamate, zinc diethyldithiocarbamate, zinc dibutyldithiocarbamate, zinc dibenzyldithiocarbamate, lead dimethyldithiocarbamate, selenium diethyldithiocarbamate, tellurium diethyldithiocarbamate, zinc ethylphenyldithiocarbamate, zinc dithiocarbamate, calcium dithiocarbamate and suitable mixtures thereof.

Preferred type A curing agents are the more commonly found dithiocarbamates, for example, zinc dibutyldithiocarbamate, zinc diethyldithiocarbamate, and bismuth dimethyldithiocarbamate.

The second component of the curing system which is required in the practice of the invention and which is referred to as curing agent type B can be any Group VIIB or Group VIII metal compound of an organic carboxylic acid or any Group VIIB or Group VIII metal compound of a beta-diketone. This would include both cyclic and acyclic carboxylic acids, where the term "cyclic" includes both aromatic and nonaromatic compounds. It is believed that the active species in the type B curing agent is generally the metal; and therefore the anion is of lesser importance. Preferred metals are manganese, iron, cobalt, and nickel. These are preferred because of their usual availability and/or activity. Suitable examples of anions which can be used in the type B curing agent include carboxylates, dicarboxylates, and acetyl acetonates. Anions of monocarboxylic acids are preferred in the practice of the invention because these anions exhibit good solubility or compatibility with the overall system.

The preferred metal compounds of carboxylic acids are represented by the general formula

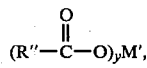

wherein M' can be any Group VIIB or Group VIII metal; R" is a hydrocarbyl group having from 1 to 18 carbon atoms; and y will generally be 1, 2, or 3, depending upon the valence of the metal M' employed. Anions of monocarboxylic acids include for example propionates, butyrates, pentanoates, hexanoates, octanoates, ethylhexanoates, decanoates, dodecanoates, and mixtures thereof.

Examples of suitable dicarboxylates which can be used as the required type B curing agent are oxalates, malonates, succinates, glutarates, adipates, pimelates, suberates, azelates, sebacates, and suitable mixtures thereof.

Suitable metal compounds of beta-diketones which can be used as the required type B curing agent are represented by the formula

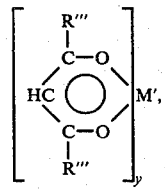

wherein M' is any Group VIIB or Group VIII metal; the (R''')'s are individually selected from the group consisting of hydrocarbyl groups having from 1 to about 18 carbon atoms per hydrocarbyl group; and y will generally be 1, 2, or 3, depending upon the valence of the metal employed. Examples of these suitable materials include (but are not limited to): manganese(II) 2,4-pentanedionate (also called acetylacetonate); manganese(III) 2,4-heptanedionate; nickel(II) 2,4-octanedionate; cobalt(II) 2,4-pentanedionate; and cobalt(III) 2,4-pentanedionate and mixtures thereof.

It is expected that the type A and type B curing agents as described above can be stored together as a separate curing package for subsequent curing of the basic polymer (the curing occuring when the total combined system is exposed to environmental conditions as herein described).

In the practice of the invention, the curing system can also contain (besides the type A curing agent material, defined above, and the type B curing agent material, defined above) calcium peroxide and/or calcium oxide. The presence of calcium peroxide and/or calcium oxide generally helps to increase the rate of curing and enhances performance properties of the cured elastomeric product. However, the invention in its broadest aspects is not to be construed as limited to requiring the presence of calcium peroxide and/or calcium oxide.

Fillers, plasticizers, pigments, antioxidants and similar additives can be employed with the base material and the curing system of this invention. The selection of these additives is left to those skilled in the art, it being understood that they should be chosen so that they do not produce undesirable products or results with the mercaptan-containing base material or the curing system.

The air-curable compositions according to the invention are useful for a variety of purposes, including sealants. When a sealant is to be formulated from the PM Polymer described in Table I, the following recipe will preferably be used.

When other mercaptan-containing materials are to be cured, the relative amounts of curing agents may be varied from those in Table II, depending generally upon the mercaptan content of the material to be cured. As the mercaptan content of the material to be cured increases, an increased amount of curing agents will generally be needed.

Table II

| General Sealant Formulation | |
|---|---|
| Component | Parts by Weight of Polymer |
| A mercaptan-containing polymer, the properties of which are described in Table I | 100 |
| Filler(s) and pigments | 50–300 |
| Plasticizer | 2–20 |
| Thickener | 1–10 |
| Antioxidant | 0.1–5 |
| Curing agent type A[a] | |
| Broad | 0.05–10 |
| Preferred | 0.5–5 |
| Curing agent type B[b] | |
| Broad | 0.005–1.0 |
| Preferred | 0.05–0.5 |

[a] Metal substituted dithiocarbamate (parts based on total weight of the metal substituted dithiocarbamate per 100 parts mercaptan containing polymer).
[b] Metal compound of an organic acid (parts based on metal content of curing agent type B per 100 parts mercaptan-containing polymer).

Although the formulation given in Table II is recommended for a sealant which is to be used in the building trade, other formulations may be preferable for other uses. Such formulations would also be within the scope of this invention. The amount of curing agent used is based on the amount of the particular mercaptan-containing polymer employed, and this ratio should generally remain the same for the same polymer regardless of the product application.

The method of preparing the compositions according to the invention involves adequate mixing of the required ingredients. Generally, to insure good mixing, all liquids will be placed first into the mixer being used; and then solids will be added to the liquids and will preferably be followed by a vacuum treatment to remove entrapped air and/or oxygen. Therefore, generally the curing agents will be added to the mixture last and preferably under a nitrogen cover so as to aid in safeguarding against any possible exposure of the mixture to air and/or oxygen.

EXAMPLES

The following examples serve to illustrate this invention; however, the invention is not to be construed as limited thereto.

The following recipe was used to prepare a pre-mix which was then used in Examples I and III (described below). This recipe was slightly modified to prepare the pre-mix for Example II, the only modifications being that pigments (items 7, 8, and 9) were excluded from the formulation (and therefore the weight percents of the ingredients which were present in Example II were slightly different from those in the pre-mix recipe given below).

| Recipe for PM Polymer Pre-mix | |
|---|---|
| Ingredient | Wt. % |
| 1. Mercaptan-containing liquid polymer[a] | 35.0 |
| 2. 50% Chlorinated paraffin[b] (plasticizer) | 3.8 |
| 3. Calcium carbonate[c] (filler) | 39.3 |
| 4. Titanium Dioxide[d] (filler) | 18.8 |
| 5. A fumed silica [e] (thickener) | 2.5 |
| 6. 2,2'-Methylene bis (4-methyl-6-t-butyl phenol)[f] (antioxidant) | 0.28 |
| 7. A cadmium-based pigment[g] | 0.18 |
| 8. Iron oxide[h] (pigment) | 0.09 |
| 9. Carbon black[i] (pigment) | 0.09 |
| Total | 100.04 |

[a]PM Polymer-Phillips Petroleum Company prepared by the method described in allowed case having Serial No. 737,948, which method is described below.
[b]Clorafin ® 50-Hercules Incorporated.
[c]Hi Pflex ® 100-Pfizer Minerals.
[d]No. 2060-Titanox Pigment Corporation.
[e]Cab-O-Sil ®, M-5 from the Cabot Corporation.
[f]Cyanamid 2246-American Cyanamid.
[g]Yellow Pigment, No. 1476 from Harshaw Chemical.
[h]Red pigment, R-2199, Pfizer Minerals.
[i]Type N765, Phillips Petroleum Company.

Preparation of PM Polymer

The following is a description of a typical preparation of the PM Polymer used in the invention runs in Examples III, IV, and V, described below.

Into a one-gallon stainless steel reactor fitted with a stirrer, pressure gauge, temperature measuring device and internal cooling coil was placed methanol (600 ml), concentrated ammonium hydroxide (28 weight percent $NH_3$, 21.6 gm), sulfur (12 gm) and hydrogen sulfide (816 gm). Methyl acrylate (1376 gm) was introduced into the stirred reactor over a 45 minute interval. Over the reaction period the temperature of the reaction mixture increased from 23° C. to 53° C. while the pressure decreased from 1650 kPa (240 psig) to 1150 kPa (169 psig). After an additional 30 minute period of stirring the reactor was vented to release excess hydrogen sulfide and the remaining reaction solution was transferred to a fractionation apparatus.

A total of 5 runs were made as described above. The resulting reaction mixtures were combined prior to fractional distillation.

A fraction (5889 gm) was collected over a boiling range of 87°–93° C. at 50 torr (mm Hg) pressure which contained 98.6 weight percent methyl 3-mercaptopropionate (analyzed by GLC, i.e., gas-liquid chromatography). The undistilled pot residue (3005 gm) contained 85 weight percent dimethyl thiodipropionate and 15 weight percent dimethyl dithiodipropionate, analyzed by GLC.

Into a 3 liter, stirred, heated glass reactor was added polyether polyol (550 gm of LHT-34 from Union Carbide -derived from 1,2,6-hexanetriol and propylene oxide, having a molecular weight of about 4500 and a hydroxyl number, which is the milliequivlaents of OH groups per gram of polyol, of about 34). Nitrogen (0.056 $m^3$/hr) was bubbled through the stirred reactor and the contents maintained at 100° C. for one hour to remove residual water. The nitrogen flow was then reduced to 0.0056 $m^3$/hr, a reflux condenser was attached and methyl-3-mercaptopropionate (25.9 gm fraction described above), sulfide-disulfide mixture (14.1 gm-undistilled pot residue described above), and tetrabutyl titanate (0.2 ml, du Pont's Tyzor TBT, essentially 0.2 g pure tetrabutyl titanate) were added to the reactor. The stirred reaction mixture was maintained at 177° C. for 24 hours. The nitrogen flow through the reaction mixture swept out the methanol formed in the transesterification reaction. At the end of the 24 hour period, the reflux condenser was removed and the nitrogen flow rate was increased to 0.056 $m^3$/hr with the temperature maintained at 177° C. for one hour to remove volatiles. The resultant poly(oxyalkylene)-polyester-poly(sulfide)-polythiol possessed 0.88 weight percent mercaptan sulfur and a viscosity of 6800 centipoises at 25° C.

The ingredients given above in the Recipe for PM Polymer Pre-mix were mixed together in a mixer at ambient room temperature generally in the order listed. The pre-mix was then used in Examples I, II, and III, as described below.

In accordance with ASTM D 638-56T, specimens were formed, were allowed to cure, and were subjected to measurements of several properties related to the resilience of the specimens. These properties were 50% modulus, tensile strength, and elongation.

EXAMPLE I (Control)

For purposes of comparison, a two-package sealant composition was prepared and evaluated. The curing agent was based on lead dioxide.

To 100 grams of the above-described sealant pre-mix was added 2.1 grams of a curing paste that contained 50 weight percent lead dioxide, 45 weight percent dibutyl phthalate and 5 weight percent stearic acid (C-5500, G. P. Roeser Company). The resulting mixture was then cast into a picture frame mold having dimensions 2½ inches×2½ inches×⅛ inch. The composition was allowed to cure at room temperature (about 25° C.) for 14 days. The humidity in the room remained between 45 and 50 percent. The surface of the composition became tack-free to polyethylene film within 72 hours; but it retained some finger tack even after 2 to 3 weeks. Finger tack is tested by touching the specimen being tested with an index finger and noting how tacky (i.e., sticky) the specimen feels. After a period of 14 days, the cured composition was removed from the frame; and some performance properties related to resilience were measured by the method of ASTM D 638-56T. Properties measured were as follows:

50% modulus: 50 psi;
tensile strength: 135 psi;
elongation: >700 percent.

EXAMPLE II (Control)

This example illustrates the unsatisfactory results obtained when one attempts to cure a particular mercaptan-containing polymer with a curing system disclosed in U.S. Pat. No. 3,991,039 comprising a manganese salt of a carboxylic acid and a known sulfur-based rubber cure accelerator (i.e., tetramethylthiuram disulfide). To 50 grams of the sealant pre-mix described above (with the exception that no pigments were present) was added 0.1 gram of tetramethylthiuram disulfide (Methyl Tuads) and 0.4 gram of a 37.28 weight percent solution of manganese(II) 2-ethylhexanoate in mineral spirits (containing 6 weight percent manganese metal, supplied by Mooney Chemicals under the name 6 percent Manganese Hex-Cem ® Liquid). After 2.5 weeks at ambient room temperature in an air atmosphere with a humidity between 45 and 50 percent, the mixture had surface cured (i.e., had skinned over) but was still finger tacky. After 11 days at ambient room temperature, a center portion of the composition was examined and found to be uncured. This same portion remained uncured for the next 4 days.

EXAMPLE IIIA (Invention)

To 50 grams of the sealant pre-mix described above was added 0.4 gram of the 37.28 weight percent solution of manganese(II) 2-ethylhexanoate in mineral spirits (containing 6 weight percent manganese metal), described above, and 0.3 gram zinc dibutyldithiocarbamate. The ingredients were thoroughly mixed for about 1 to 3 minutes, and the mixture was then immediately spread into the same type of picture frame mold as described in Example I. Although the composition was not stored before use, Example IV demonstrates storage ability of the inventive composition.

When the inventive composition was exposed to air, the sealant became surface tack-free to polyethylene within the short time period of 45 minutes. Although finger tack in this particular run was not tested, finger tack of another sample of the inventive composition was tested in Example IIIC, described below. After about 5.5 weeks of exposure to air, the specimens were removed from the mold and the following properties were measured:

50% modulus: 27 psi;
tensile strength: 103 psi;
elongation: 755 percent.

The properties of the inventive composition compare very favorably with those of the standard two-package sealant prepared and described in Example I. This is significant in that (as described above) a two-package system will generally give better cured performance properties than a one-package sealant system (provided that human errors can be excluded from the mixing step in the preparation).

EXAMPLE IIIB (Invention)

A composition similar to that described in Example IIIA was prepared from 50 grams of the sealant pre-mix described above, 0.2 gram of the 37.28 weight percent solution of manganese(II) 2-ethylhexanoate in mineral spirits (containing 6 weight percent manganese metal) described above, 0.2 gram of zinc dibutyldithiocarbamate, and 2 grams of calcium oxide. Surface curing was observed to occur almost immediately, as indicated by "skinning" within 1-2 minutes.

In another invention run, wherein calcium peroxide was employed instead of calcium oxide, skinning and subsequent internal curing also occurred faster than when neither calcium peroxide nor calcium oxide was present.

EXAMPLE IIIC (Invention)

A composition similar to that described in Example IIIA was prepared from 50 grams of the sealant pre-mix described above, 0.2 gram of the 37.28 weight percent solution of manganese(II) 2-ethylhexanoate in mineral spirits (containing 6 weight percent manganese metal) described above, and 0.2 gram of zinc dibutyldithiocarbamate. The ingredients were thoroughly mixed for 1 to 3 minutes, and the mixture was then spread into the same type of picture frame mold as described in Example I. After being exposed to air with a relative humidity between 45 and 50 percent for 2.5 weeks, the composition was tested for finger tack. It was found to be less finger tacky than the composition of Example II (Control), both compositions having been exposed to air for the same length of time.

Table III

Summary of Data from Examples I, II, IIIA, IIIB, and IIIC

| Example: | I (Control) | II (Control) | IIIA (Invention) | IIIB (Invention) | IIIC (Invention) |
|---|---|---|---|---|---|
| I. 35 weight percent PM Polymer pre-mix | 100g | 50g(k) | 25g | 50g | 25g |
| II. Curing Agents: | | | | | |
| a. 50 weight percent lead dioxide paste | 2.1g | — | — | — | — |
| b. 57 weight percent calcium peroxide paste | — | — | — | 2g | — |
| c. Manganese (II) 2-ethylhexanoate(l) | — | 0.4g | 0.1g | 0.2g | 0.2g |
| d. Zinc di-n-butyldithiocarbamate(m) | — | — | 0.1g | 0.2g | 0.1g |
| e. Tetramethylthiuram disulfide(n) | — | 0.1g | — | — | — |
| III. Cured Performance Properties: | | | | | |
| a. 50 percent modulus, psi | 50 | — | 27 | — | — |
| b. Tensile strength, psi | 135 | — | 103 | — | — |
| c. Percent elongation | 700 | — | 755 | — | — |
| IV. Comments: | Tacky (finger tacky) after 2 to 3 wks. | Cured in 2.5 wks. but more tacky (finger tacky) than | Tack free to polyethylene(o) after 45 min. | Skinning within 1-2 minutes. (No finger tack after 2 min.) | Less tacky (finger tacky) than Ex. II after 2.5 wks. |

Table III-continued

| | Summary of Data from Examples I, II, IIIA, IIIB, and IIIC | | | | |
|---|---|---|---|---|---|
| Example: | I (Control) | II (Control) | IIIA (Invention) | IIIB (Invention) | IIIC (Invention) |
| | | | Ex. IIIC | | |

[k] Contains 0 weight percent pigments.
[l] 6 weight percent Mn Hex-Cem.
[m] Butyl Zimate. Trademark R.T. Vanderbilt Co., Inc.
[n] Methyl Tuads. Trademark R.T. Vanderbilt Co., Inc.
[o] Tested as described in Federal Specification TT-S-00230C.

EXAMPLE IV (Invention)

The following example further illustrates the usefulness of an embodiment of the present invention as a one-package sealant suitable for use in the building trade. The recipe shown below was used to prepare a formulation which was subjected to Federal Specification Test TT-S-00230C for single package elastomeric building sealants, Type II (non-sag), Class A. The formulation was also subjected to a series of viscosity measurements.

| Component | Recipe Weight Percent |
|---|---|
| Mercaptan-containing PM Polymer | 34.70 |
| Calcium carbonate (Hi Pflex 100) (filler) | 38.98 |
| Titanium Dioxide (filler) | 18.65 |
| 50% chlorinated paraffin (Clorafin 50) (plasticizer) | 3.77 |
| Fumed silica (Cab-O-Sil, M5) (thickener) | 2.48 |
| 2,2'-Methylene bis(4-methyl-6-t-butyl phenol) (Cyanamid 2246) (antioxidant) | 0.28 |
| Zinc dibutyldithiocarbamate | 0.35 |
| 6 percent Mn Hex-Cem Liquid | 0.79 |
| | 100.00 |

Samples were prepared, were allowed to cure, and were subjected to tests in accordance with Federal Specification TT-S-00230C.

It was observed that the samples skinned over immediately upon exposure to air after the one-package composition had been stored inside a hermetically-sealed container for about 24 to about 48 hours.

These samples were subjected to various tests for a one-package sealant composition as specified in Federal Specification TT-S-00230C. All of these tests examine various performance properties of the sealant. The test requirements and results for the inventive sealant specimens are displayed in Table IV. A series of viscosity measurements were also run on samples of the inventive sealant composition; and the results are shown in Table V.

Table IV

| One-Package PM Polymer-Based Sealant Performance According to Federal Specification TT-S-00230C | | | |
|---|---|---|---|
| Test | Substrate[a] | Required Value | Value Obtained |
| 1. Canvas Peel, ppiw | Glass | >5 | 25 |
| | Aluminum | >5 | 35 |
| | Concrete | >5 | 9 |
| 2. Canvas Peel After UV and H₂O Exposure, ppiw | Glass | >5 | Adhesive Failure[b] |
| 3. Durability, ± 25% extension-compression at 25° C. | Glass | 10 cycles | passed |
| | Aluminum | 10 cycles | passed |
| | Concrete | 10 cycles | failed[b] |
| 4. Durability, ± 25% extension-compression between −26° C. (−15F) and 70° C. (158° F.) | Glass | 10 cycles | passed |
| | Aluminum | 10 cycles | passed |
| | Concrete | 10 cycles | not tested[c] |
| 5. Hardness, A2 Durometer at 25° C. | — | ≧15 and ≦50 | 34 |
| 6. Weight Loss, after heat treatment at 70° C. | — | ≦10% | 1.1% |
| 7. Tack-free (to polyethylene film) time, hours | — | ≦72 | 1-2 |
| 8. Stain/Color | Concrete | no stain | no stain |
| 9. Extrusion Rate, seconds | — | ≦45 | 9-10 |
| 10. Sag, 4.4° C. (40° F.), inches | — | ≦3/16 | 1/16 |
| 50° C. (122° F.), inches | — | ≦3/16 | 1/16 |

[a] All surfaces were primed with a mixture of 86.8 wt. % P-47 primer and 13.2 wt. % A-187. A-187 is gamma-glycidoxypropyl trimethoxy silane available from Union Carbide. P-47 is a 10 wt. % of an isocyanate dissolved in toluene.
[b] Failure attributed to improper selection of primer.
[c] Failed in previous test (See test 3, described above).

The data in Table IV show that the inventive composition prepared in Example IV is quite satisfactory for use as a sealant in the building trade.

For surfaces of aluminum, the sealant passed all of the ten performance tests required for a one-package sealant under Federal Specification TT-S-00230C. For surfaces of concrete and glass, the sealant passed most of those ten tests; and where failure was observed, it is believed that it was due to the primer used and was not due to the sealant since the failure was always at the sealant-substrate interface.

As described above, a one-package sealant composition must be able to remain relatively uncured in a container for a reasonable length of time and must then begin to cure only after exposure to environmental conditions, for example, air or oxygen. In order to demonstrate the stability of a sample of the inventive composition during an extended period of storage (and thus to demonstrate its usefulness as a one-package sealant system), a series of viscosity measurements on specimens of the sealant composition were made at 25° C. Samples of the freshly mixed sealant composition were placed in a number of screw-capped no. 9 dram glass vials. These were stored at ambient room temperature for various periods of time. Then each vial and its contents were placed in a constant temperature bath at 25° C. for 1 hour; and after this time period, the viscosity in centipoises (Cps) and in Pascal-seconds (Pa.S) was measured, using a Brookfield Viscometer Model RVT-E with a No. 7 spindle. Measurements were made at various speeds given in revolutions per minute (rpm); and the data are shown in Table V.

Table V

Storage Stability of One-Package PM Polymer-Based Sealant

| | Viscosity at 25° C. Using Various Spindle Speeds | | | | | |
|---|---|---|---|---|---|---|
| | 0.5 rpm | | 1.0 rpm | | 5 rpm | |
| Time in Storage at 25° C., Days | Pa . S $\times 10^{-3}$ | Cps $\times 10^{-3}$ | Pa . S $\times 10^{-3}$ | Cps $\times 10^{-3}$ | Pa . S $\times 10^{-3}$ | Cps $\times 10^{-3}$ |
| 2 | 3.03 | 3,030 | 1.69 | 1,690 | 0.591 | 591 |
| 31 | 3.28 | 3,280 | 1.80 | 1,800 | 0.624 | 624 |
| 57[a] | 2.84 | 2,840 | 1.72 | 1,720 | 0.536 | 536 |

[a] Extruded sample skins over in 1–2 hours, indicating initiation.

The data in Table V show no significant increase in viscosity of specimens after they have been stored for as long as 57 days. Therefore, the composition does not appear to cure to a substantial extent while it is hermetically stored. Thus, it is suitable for use as a one-package system.

EXAMPLE V

In this example, control runs VA and VB demonstrate that no observable amount of cure is obtained when either the type A curing agent or the type B curing agent was used along to cure a mercaptan-containing polymer. Control run VC shows that no cure was effected when both the type A and type B curing agents were absent from the formulation. An invention run VD is included to show that a cure was achieved when both type A and type B curing agents were used together. An invention run VE was included to show the changes in the formulation of run VD made to improve sag properties.

RECIPE

Weight Percent

| Ingredient | Run VA (Control) | Run VB (Control) | Rin VC (Control) | Run VD (Invention) | Run VE (Invention) |
|---|---|---|---|---|---|
| 1. Mercaptan-containing liquid polymer[a] | 30 | 30 | 30 | 30 | 23.5 |
| 2. Calcium carbonate[b] (filler) | 50 | 50 | 50 | 50 | 60 |
| 3. Liquid polyester[c] (plasticizer) | 15 | 15 | 15 | 15 | 11.5 |
| 4. Titanium dioxide[d] (filler) | 1.0 | 1.0 | 1.0 | 1.0 | 1.0 |
| 5. Fumed silica[e] (thickener) | 1.7 | 1.7 | 1.7 | 1.7 | 1.7 |
| 6. 2,2'-methylene bis(4-methyl-6-t-butyl phenol)[f] (antioxidant) | 0.3 | 0.3 | 0.3 | 0.3 | 0.3 |
| 7. Sorbitan monostearate[g] (surface active agent) | 1.0 | 1.0 | 1.0 | 1.0 | 1.0 |
| 8. Surface active agent[h] | 1.0 | 1.0 | 1.0 | 1.0 | 1.0 |
| 9. ManganeseII 2-ethylhexonate[i] | 0.70 | — | — | 0.70 | 0.53 |
| 10. Zinc di-n-butyldithiocarbamate[j] | — | 0.35 | — | 0.35 | 0.27 |

[a] PM polymer, described previously.
[b] Hi Pflex 100, described previously.
[c] Paraplex G-40, obtained from Rohm and Haas Company, average molecular weight about 6,000, acid no. 1.4 milligrams potassium hydroxide per gram of sample, saponification no. 585.
[d] No. 2060, obtained from Titanox Pigment Corporation.
[e] Cab-O-Sil, M-5, obtained from the Cabot Corporation.
[f] Cyanamid 2246, obtained from American Cyanamid.
[g] Span 60, obtained from ICI Americas, Inc.
[h] Nopco L-34A, obtained from Nopco Chemical Company.
[i] Six weight percent MnHex Cem, described previously.
[j] Butyl Zimate. Trademark R. T. Vanderbilt Co., Inc.

Formulations were prepared according to the above-described recipe, and the resulting mixtures were then cast into picture frame molds as described in Example I. The specimens in runs VA, VB, VC, and VD were then subjected to the same curing conditions. They were all placed in an oven at a temperature of 70° C. for the same length of time (which was a period of about 16 to 20 hours).

It was found that in control runs VA and VB, wherein only one of the required inventive ingredients was used, no observable amount of cure resulted under the curing conditions described above, the samples in those runs retaining the consistency they had before they were subjected to the curing conditions. Likewise, in control run VC, no cure resulted.

In invention run VD where both the type A and type B curing agents were used, under the same curing conditions, a cure was achieved. It is noted that the formulation in run VD did not have good sag properties, the cured composition having considerable sag (i.e. greater than 3/16 inch). When the relative amount of filler was increased and the relative amount of plasticizer was slightly decreased, as shown in the recipe for run VE, and when that formulation was cured at room temperature (i.e., about 25° C.) for 3 weeks, that formulation was found to cure in that time period and to have acceptable sag properties, the sag being less than 3/16 inch. The specimen was then subjected to tests, and the following properties were measured:

50% modulus: 33 psi;
tensile strength: 82 psi;
elongation: 742 percent.

Although the Examples have been described in detail for purposes of illustrating the invention, the invention is not be construed as limited thereby. Rather, it is intended to cover reasonable modifications which would be apparent to one with ordinary skill in the art.

I claim:

1. A composition comprising a type A compound and a type B compound,
   wherein said type A compound is selected from the group consisting of substituted dithiocarbamates represented by the formula

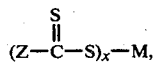

wherein M is at least one metal selected from the group consisting of metals in groups IA, IB, IIA, IIB, IVA, VA, and VIA of the periodic table,
   wherein Z is selected from the group consisting of
   (1) an amino group having the formula $H_2N-$,
   (2) a disubstituted amino group having the formula $RR'N-$,
   (3) a monosubstituted amino group having the formula $HRN-$, and
   (4) a heterocyclic amino group,
   wherein R and R' are individually selected from the group consisting of hydrocarbyl groups having from 1 to about 18 carbon atoms per hydrocarbyl group, and
   wherein x is an integer between 1 and 4 inclusive; and
   wherein said type B compound is a compound selected from the group consisting of Group VIIB metal compounds of carboxylic acids, Group VIII metal compounds of carboxylic acids, Group VIIB metal compounds of beta diketones, and Group VIII metal compounds of beta diketones.

2. A composition according to claim 1 further comprising at least one base material selected from the group consisting of mercaptan-containing materials.

3. A composition according to claim 2 wherein said mercaptan-containing material is a polymer.

4. A composition according to claim 3, wherein the molecular weight of said polymer lies within the range from about 100 to about 100,000.

5. A composition according to claim 4, wherein the molecular weight of said polymer is greater than about 10,000.

6. A composition according to claim 5, wherein said polymer is a liquid at about room temperature.

7. A composition according to claim 6, wherein said liquid mercaptan-containing polymer contains sulfide linkages, the majority of which are monosulfide linkages.

8. A composition according to claim 7, wherein said liquid mercaptan-containing polymer is a poly(oxyalkylene)-polyester-poly(monosulfide)-polythiol.

9. A composition according to claim 8, wherein said poly(oxyalkylene)-polyester-poly(monosulfide)-polythiol has a molecular weight within the range from about 12,000 to about 15,000 and an average mercaptan functionality per molecule lying within the range from about 3 to about 5.

10. A composition according to claim 9 or claim 1 wherein said type A curing agent is selected from the group consisting of sodium monoethyldithiocarbamate, sodium di-n-butyldithiocarbamate, calcium diethyldithiocarbamate, cadmium diethyldithiocarbamate, bismuth dimethyldithiocarbamate, copper dimethyldithiocarbamate, zinc monomethyldithiocarbamate, zinc diethyldithiocarbamate, zinc dibutyldithiocarbamate, zinc dibenzyldithiocarbamate, lead dimethyldithiocarbamate, selenium diethyldithiocarbamate, tellurium diethyldithiocarbamate, zinc ethylphenyldithiocarbamate, zinc dithiocarbamate, calcium dithiocarbamate and suitable mixtures thereof, and wherein said type B curing agent is selected from the group consisting of compounds having at least one cation selected from the group consisting of manganese, iron, cobalt and nickel and mixtures thereof and having at least one anion selected from the group consisting of propionates, butyrates, pentanoates, hexanoates, octanoates, ethylhexanoates, decanoates, dodecanoates, oxalates, malonates, succinates, glutarates, adipates, pimelates, suberates, azelates, sebacates, 2,4-pentanedionates, 2,4-heptanedionates, 2,4-octanedionates, and mixtures thereof.

11. A composition according to claim 9 or claim 1, wherein Z is a disubstituted amino group.

12. A composition according to claim 9 comprising: (a) about 100 parts by weight of said poly(oxyalkylene)-polyester-poly(monosulfide)-polythiol; (b) about 0.05 to about 10 parts by weight of a type A compound; and (c) about 0.005 to about 1.0 parts by weight of metal of a type B compound.

13. A composition according to claim 9 comprising (a) about 100 parts by weight of said poly(oxyalkylene)-polyester-poly(monosulfide)-polythiol; (b) about 0.5 to about 5; (c) about 0.05 to about 0.5 parts by weight of metal of a type B compound.

14. A composition according to claim 13, and including also about 50 to about 300 parts by weight of fillers and pigments; about 2 to about 20 parts by weight of plasticizer; about 1 to about 10 parts by weight of thickener; and about 0.1 to about 5 parts by weight of antioxidant.

15. A composition comprising about 30 to about 40 weight percent of a poly(oxyalkylene)-polyester-poly(monosulfide)-polythiol having a molecular weight within the range from about 12,000 to about 15,000 and an average mercaptan functionality per molecule lying within the range from about 3 to about 5; about 0.2 to about 0.5 weight percent of zinc dibutyl dithiocarbamate; and about 0.5 to about 1.0 weight percent of a 37.28 weight percent solution of manganese(II)-2-ethyl hexanoate in mineral spirits.

16. A composition according to claim 11 wherein said Group VIIB and Group VIII metal compounds of carboxylic acids are represented by the formula

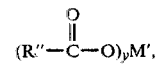

wherein M' is selected from the group consisting of Group VIIB and Group VIII metals,
wherein R" is individually selected from the group consisting of hydrocarbyl groups having from 1 to about 18 carbon atoms per hydrocarbyl group, and
wherein y is 2 or 3, and wherein said Group VIIB and Group VIII metal compounds of beta diketones are represented by the formula

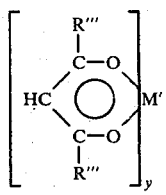

wherein M' is selected from the group consisting of Group VIIB and Group VIII metals,
wherein (R''') is individually selected from the group consisting of hydrocarbyl groups having from 1 to about 18 carbon atoms per hydrocarbyl group, and
wherein y is an integer between 1 and 3, inclusive.

17. A composition according to claim 16, wherein M is zinc, and wherein M' is selected from the group consisting of manganese, iron, cobalt, and nickel.

18. A composition according to claim 17, wherein said type A compound is zinc dibutyl dithiocarbamate and wherein said type B compound is manganeseII-2-ethyl hexanoate.

19. A composition according to claim 18, wherein said type A compound is present in an amount within the range from about 0.05 to about 10 parts by weight per 100 parts by weight of mercaptan-containing polymer and wherein said type B compound is present in an amount within the range from about 0.005 to about 1.0 parts by weight of metal per 100 parts by weight of mercaptan-containing polymer.

20. A composition according to claim 18, wherein said type A compound is present in an amount within the range from about 0.05 to about 5 parts by weight per 100 parts by weight of mercaptan-containing polymer and wherein said type B compound is present in an amount within the range from about 0.05 to about 0.5 parts by weight of metal per 100 parts by weight of mercaptan-containing polymer.

21. A composition according to claim 20, and including also a compound selected from the group consisting of calcium oxide and calcium peroxide.

* * * * *